US012795769B2

(12) United States Patent
Awad et al.

(10) Patent No.: US 12,795,769 B2
(45) Date of Patent: Nov. 10, 2026

(54) METHODS, COMMUNICATIONS DEVICES, AND INFRASTRUCTURE EQUIPMENT

(71) Applicant: Sony Group Corporation, Tokyo (JP)

(72) Inventors: Yassin Aden Awad, Basingstoke (GB); Vivek Sharma, Basingstoke (GB); Yuxin Wei, Basingstoke (GB); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 310 days.

(21) Appl. No.: 18/576,744

(22) PCT Filed: Jun. 21, 2022

(86) PCT No.: PCT/EP2022/066871

§ 371 (c)(1),
(2) Date: Jan. 5, 2024

(87) PCT Pub. No.: WO2023/285082

PCT Pub. Date: Jan. 19, 2023

(65) Prior Publication Data

US 2024/0397572 A1 Nov. 28, 2024

(30) Foreign Application Priority Data

Jul. 16, 2021 (EP) .................................... 21186269

(51) Int. Cl.
*H04W 76/20* (2018.01)
*H04W 72/1268* (2023.01)
(Continued)

(52) U.S. Cl.
CPC ....... *H04W 76/20* (2018.02); *H04W 72/1268* (2013.01); *H04W 72/21* (2023.01); *H04W 72/231* (2023.01); *H04W 74/0833* (2013.01)

(58) Field of Classification Search
CPC . H04W 76/20; H04W 72/1268; H04W 72/21; H04W 72/231; H04W 74/0833;
(Continued)

(56) References Cited

U.S. PATENT DOCUMENTS

2021/0203449 A1 7/2021 Chatterjee et al.
2021/0410180 A1* 12/2021 Tsai .................. H04W 72/1268
(Continued)

FOREIGN PATENT DOCUMENTS

WO 2020/030707 A1 2/2020

OTHER PUBLICATIONS

International Search Report and Written Opinion mailed on Oct. 13, 2022, received for PCT Application PCT/EP2022/066871, filed on Jun. 21, 2022, 10 pages.
Qualcomm Inc., "Revised WID on NR-based Access to Unlicensed Spectrum", 3GPP TSG RAN Meeting #84, RP-191575, Jun. 3-6, 2019, 8 pages.
Ericsson, "Requirements and use cases for small data Tx in RRC_ INACTIVE", 3GPP TSG-RAN WG2 #96, R2-168715, Nov. 14-18, 2016, pp. 1-3.
(Continued)

*Primary Examiner* — Mohamed A Kamara
(74) *Attorney, Agent, or Firm* — XSENSUS LLP

(57) ABSTRACT

A method of operating a communications device configured to transmit signals to and/or to receive signals from a wireless communications network via a wireless radio interface provided by the wireless communications network is provided. The method comprises, while the communications device is operating in an inactive state, receiving, from the wireless communications network a small data transmission, SDT, within a set of downlink resources of the wireless radio interface, determining, based on a configuration indicated by signalling information received from the wireless communications network previously to the SDT, a set of uplink resources of the wireless radio interface, and transmitting, to the wireless communications network in the determined set of uplink resources, a feedback signal in response to the received SDT.

18 Claims, 13 Drawing Sheets

(51) Int. Cl.
*H04W 72/21* (2023.01)
*H04W 72/231* (2023.01)
*H04W 74/0833* (2024.01)

(58) Field of Classification Search
CPC ... H04W 72/23; H04W 74/004; H04W 74/08; H04L 1/16; H04L 1/1664; H04L 1/1858; H04L 1/1829; H04L 27/2602; H04L 5/14; H04L 5/0064; H04L 5/0091; H04L 5/0023; H04L 5/0044; H04L 5/0053; H04L 5/0048
See application file for complete search history.

(56) References Cited

U.S. PATENT DOCUMENTS

| | | | | |
|---|---|---|---|---|
| 2022/0322419 | A1* | 10/2022 | Jeon | H04W 72/0446 |
| 2022/0408495 | A1* | 12/2022 | Agiwal | H04W 24/10 |
| 2023/0134484 | A1* | 5/2023 | Xing | H04L 1/1812 370/329 |
| 2023/0189245 | A1* | 6/2023 | Alfarhan | H04L 1/1854 370/329 |

OTHER PUBLICATIONS

Holma et al., "LTE for UMTS OFDMA and SC-FDMA Based Radio Access", John Wiley & Sons, 2009, 232 pages.

Moderator (ZTE), "Summary on the physical layer aspects of small data transmission", 3GPP TSG-RAN WG1 Meeting #105-e, R1-2106129, May 10-27, 2021, 30 pages.

Samsung, "Report from email discussion [POST113-e][501][SDT] Selection criteria and overall Procedure", 3GPP RAN WG2 Meeting #113bis-e, R2-2102707, Apr. 12-20, 2021, pp. 1-28.

Nokia et al., "Revised WID: Support of NR Industrial Internet of Things (IoT)", 3GPP TSG RAN Meeting #85, RP-192324, Sep. 16-20, 2019, 6 pages.

ZTE Corporation, "Revised work item proposal: 2-step RACH for NR", 3GPP TSG RAN Meeting #85, RP-192330, Sep. 16-20, 2019, 4 pages.

ZTE Corporation, "Work Item on NR smalldata transmissions in INACTIVE state", 3GPP TSG RAN Meeting #86, RP-193252, Dec. 9-12, 2019, 4 pages.

* cited by examiner

METHODS, COMMUNICATIONS DEVICES, AND INFRASTRUCTURE EQUIPMENT

CROSS-REFERENCE TO RELATED APPLICATIONS

The present application is based on PCT filing PCT/EP2022/066871, filed Jun. 21, 2022, which claims priority from European Patent Application No. 21186269.3, filed Jul. 16, 2021, the contents of each are hereby incorporated by reference.

BACKGROUND

Field of Disclosure

The present disclosure relates to communications devices, infrastructure equipment and methods for the efficient reception of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever-increasing range of devices associated with a wider range of data traffic profiles and types than existing systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit signals to and/or to receive signals from a wireless communications network via a wireless radio interface provided by the wireless communications network. The method comprises, while the communications device is operating in an inactive state, receiving, from the wireless communications network, a small data transmission. SDT, within a set of downlink resources of the wireless radio interface, determining, based on a configuration indicated by signalling information received from the wireless communications network previously to the SDT, a set of uplink resources of the wireless radio interface, and transmitting, to the wireless communications network in the determined set of uplink resources, a feedback signal in response to the received SDT.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
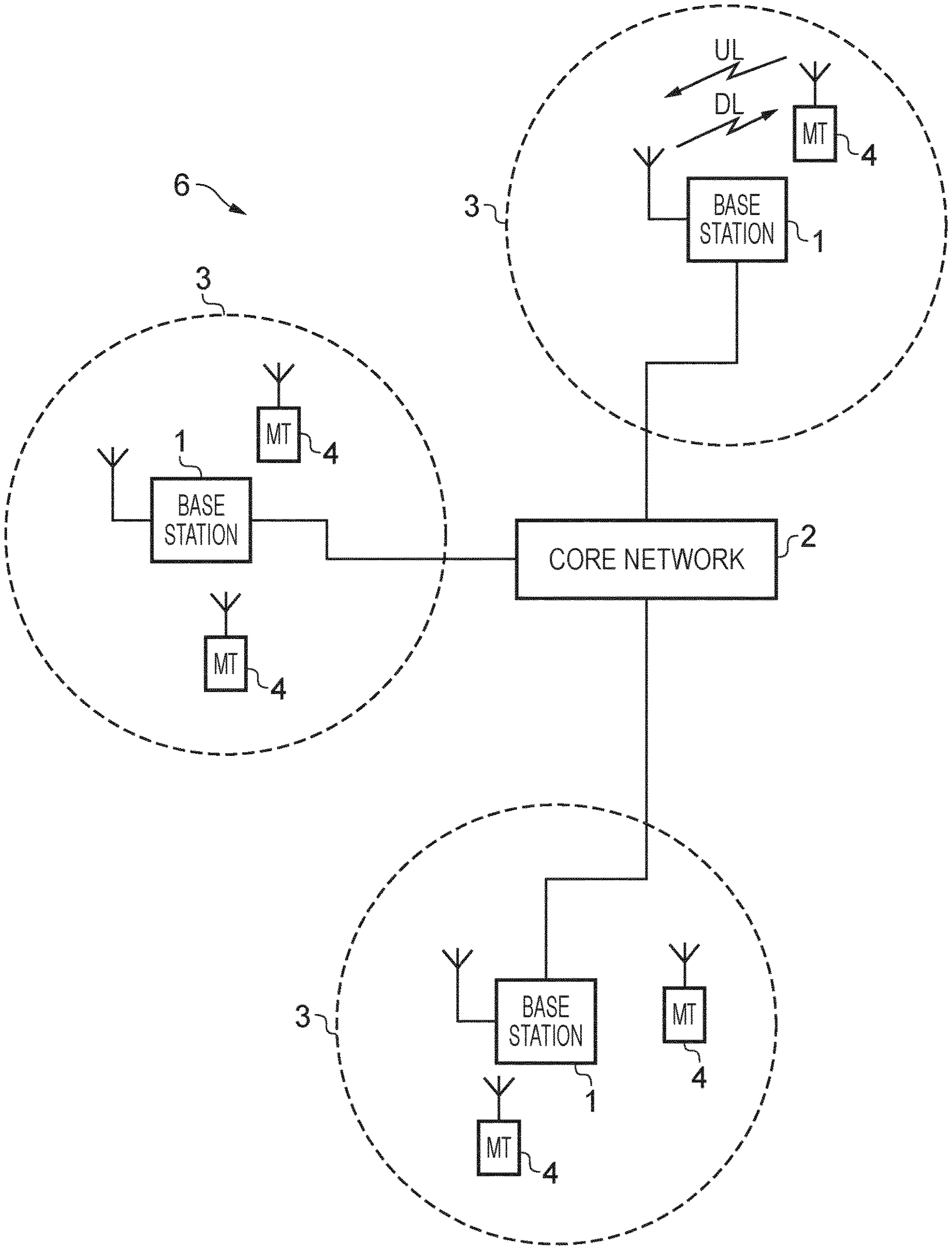
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example. Holma H, and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) 3GPP has completed the basic version of 5G in Rel-15, known as the New Radio Access Technology (NR). In addition, enhancements have been made in Rel-16, incorporating new features such as the 2-step RACH procedure [2]. Industrial Internet of Things (IIoT) [3] and NR-based Access to Unlicensed Spectrum (NR-U) [4].

Further enhancements have been agreed for Rel-17, such as small data transmissions (SDT) in the uplink while the transmitting UE is in the RRC_INACTIVE state, as well as Multicast and Broadcast Services (MBS) and positioning enhancements. With reference to [5], some specific examples of mobile originated small data transmission (MO SDT) and infrequent data traffic may include the following use cases:

Smartphone applications:
- Traffic from Instant Messaging services;
- Heart-beat/keep-alive traffic from IM/email clients and other applications; and
- Push notifications from various applications;

Non-smartphone applications;
- Traffic from wearable devices (e.g. periodic positioning information);
- Sensors (e.g., Industrial Wireless Sensor Networks transmitting temperature or pressure readings, periodically or in an event-triggered manner); and
- Smart meters and smart meter networks sending periodic meter readings.

In addition, based on [5] as mentioned above, uplink small data transmissions have been enabled for UEs in the RRC_INACTIVE state (i.e. without the UE moving to a fully connected state with the network) in order to reduce the signalling overheads as well as power consumption at the UE, and primarily being for infrequent data traffic. SDT transmission on the uplink for UEs in the RRC_INACTIVE state has been agreed for both RACH based schemes (i.e. 2-step and 4-step RACH)—known as Random Access SDT (RA-SDT)—and configured grant (CG) based schemes (CG-SDT), each of which is discussed in greater detail below. This includes general procedures to enable user plane data transmissions for small data packets on the uplink in the inactive state (for example using either MsgA of the 2-step RACH procedure or Msg3 of the 4-step RACH procedure), and enables flexible payload sizes larger than the Rel-16 Common Control Channel (CCCH) message size that is possible currently for a UE in the RRC_INACTIVE state to transmit small data in MsgA or Msg3 to support user plane data transmission in the uplink.

The NR radio access system employs Orthogonal Frequency Division Multiple Access (OFDMA), where different users are scheduled in different subsets of sub-carriers simultaneously. However, OFDMA requires tight synchronisation in the uplink transmissions in order to achieve orthogonality of transmissions from different users. In essence, the uplink transmissions from all users must arrive at the same time (i.e. they must be synchronised) at the gNB receiver. A UE that is far from the gNB must therefore transmit earlier than a UE closer to the gNB, due to different RF propagation delays. In NR, timing advance commands are applied to control the uplink transmission timing for individual UEs, mainly for Physical Uplink Shared Channels (PUSCHs). Physical Uplink Control Channels (PUCCHs) and Sounding Reference Signals (SRS). The timing advance usually comprises twice the one-way propagation delay between the UE and gNB, thus representing both downlink and uplink delays.

Figure 2:
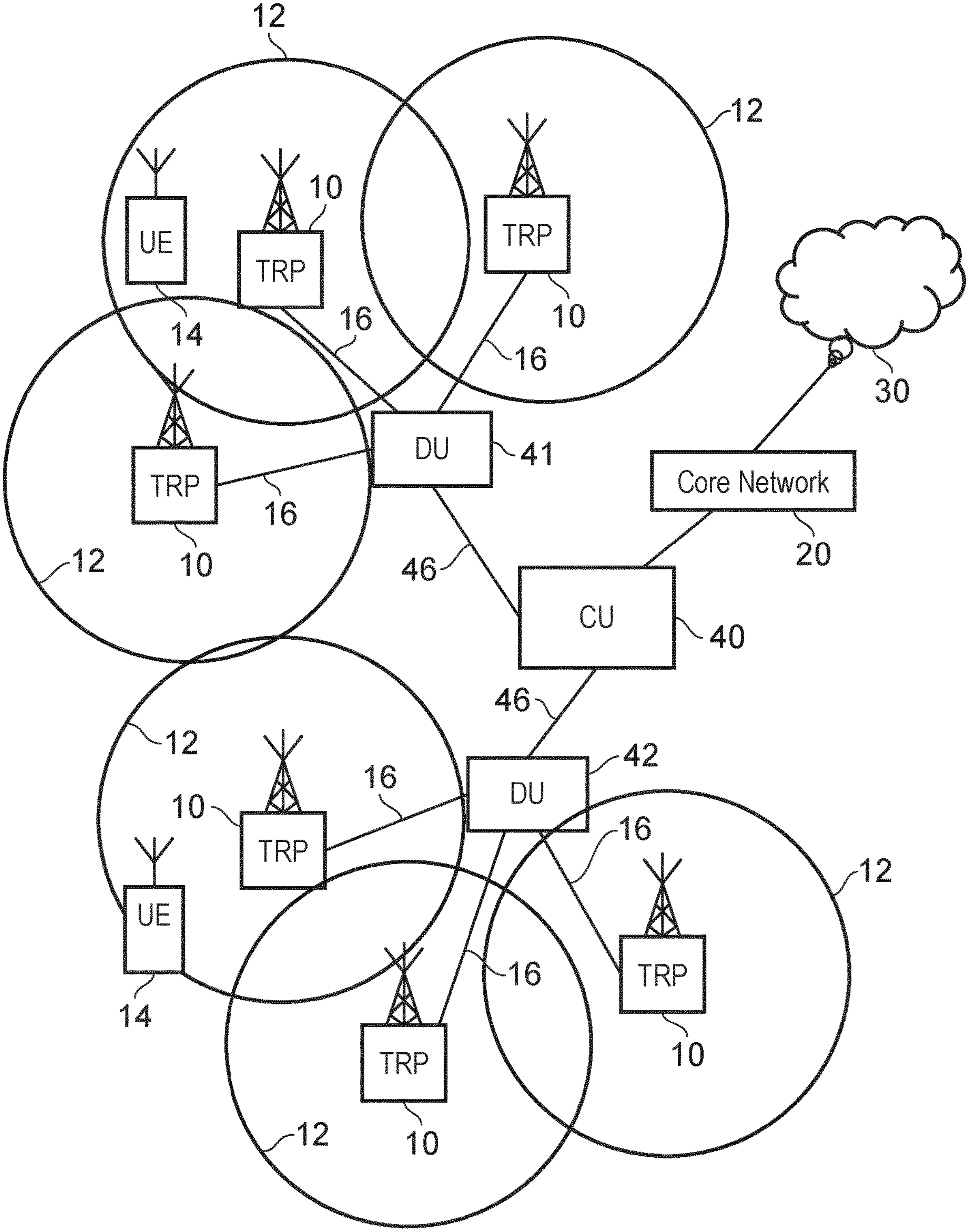
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface (i.e. a radio interface for wireless access) within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
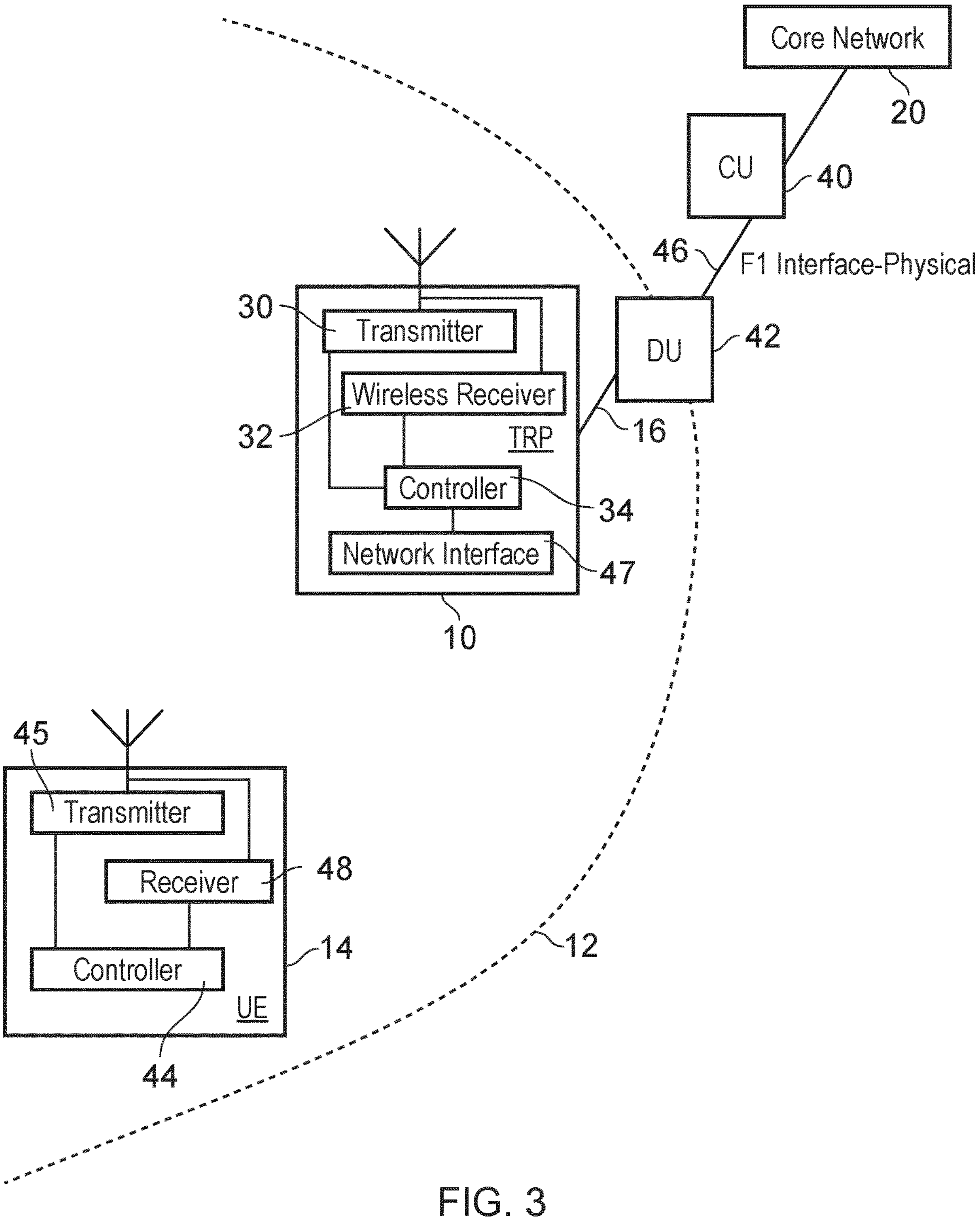
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 45, a receiver 48 and a controller 44 which is configured to control the transmitter 45 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 45 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 47 which connects to the DU 42 via a physical interface 16. The network interface 47 therefore provides a communication link for data and signalling traffic from the TRP 10 via the DU 42 and the CU 40 to the core network 20.

The interface 46 between the DU 42 and the CU 40 is known as the FI interface which can be a physical or a logical interface. The FI interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 47 of the TRP10 to the DU 42 and the FI interface 46 from the DU 42 to the CU 40.

PDSCH HARQ-ACK Feedback

In a Dynamic Grant Physical Downlink Shared Channel (DG-PDSCH), the PDSCH resource is dynamically indicated by the gNB using a DL Grant carried by Downlink Control Information (DCI) in sa Physical Downlink Control Channel (PDCCH).

A PDSCH is transmitted using HARQ transmission, where for a PDSCH ending in slot n, the corresponding Physical Uplink Control Channel (PUCCH) carrying the HARQ-ACK is transmitted in slot n+$K_1$. Here, in Dynamic Grant PDSCH, the value of $K_1$ is indicated in the field "PDSCH-10-HARQ_feedback timing indicator" of the DL Grant (carried by DCI Format 1_0. DCI Format 1_1 or DCI Format 1_2). Multiple (different) PDSCHs can point to the same slot for transmission of their respective HARQ-ACKs, and these HARQ-ACKs (in the same slot) are multiplexed into a single PUCCH. Hence, a PUCCH can contain multiple HARQ-ACKs for multiple PDSCHs.

Bandwidth Parts (BWP)

A communications device and an infrastructure equipment, such as the communications device 4 and infrastructure equipment 1 of FIG. 1 or the communications device 14 and infrastructure equipment (TRP) 10 of FIG. 2, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 1, 10 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different numerologies—i.e. values of parameters including sub-carrier spacing, symbol periods, bandwidths, and/or cyclic prefix lengths.

Mobile Originated Small Data Transmission (MO SDT)

As described, there are three schemes agreed by 3GPP for the initiation of SDT transmissions on the uplink, originating from a mobile UE in the inactive state. These are:

4-step RACH based scheme;

2-step RACH based scheme; and

CG based scheme.

Figure 4A:
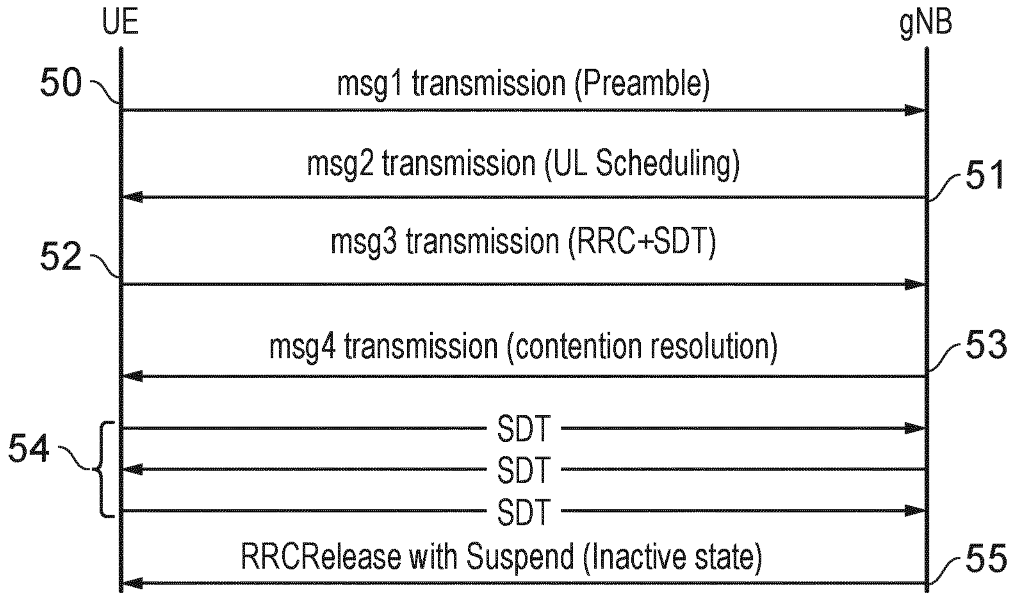
FIGS. 4A and 4B illustrate how uplink small data transmissions (SDT) may be performed by a user equipment (UE) using random access (RACH) schemes while the UE is in an inactive state.

FIG. 4A shows an example of the 4-step RACH based scheme, and shows how MO SDTs can be initiated by such a scheme. When a UE has an UL SDT ready for transmission, it may start a 4-step RACH procedure as shown in FIG. 4A, which comprises the following steps:

- A UE starts message 1 transmission 50 of a Physical Random Access (PRACH) preamble from a set of preambles allocated for SDT in the current cell. When a gNB receives the preambles, it identifies this as an SDT initiation, and responds with message 2;
- The gNB transmits 51 message 2, which contains UL timing alignment command and UL PUSCH scheduling for message 3;
- The UE transmits 52 message 3, which contains Radio Resource Control (RRC) signaling (i.e. RRCResumeRequest for initiating an SDT) and SDT data if there is any remaining space within the scheduled PUSCH;
- Similarly to the general 4-step RACH procedure, the gNB then provides 53 the contention resolution after the UE that transmitted the preamble in the first step 50 is identified and confirmed. In this step 53. DL and UL feedback or acknowledgments are transmitted:
  - For UL feedback received by a gNB from a UE in response to transmitting a DL PDSCH to that UE, a HARQ-ACK is transmitted on a cell-specific PUCCH resource configured within the system information (though it should be noted that, that from the third step 52, the UE is already UL-synchronised); and
  - For DL feedback received by a UE in response to transmitting the UL message 3 in the third step 52, the reception of message 4 in the fourth step 53 at the UE is considered as a positive acknowledgment; and
- After the fourth step 53, the UE is now already identified by the network and is also UL-synchronised. Hence, subsequent UL and DL SDT with dynamic scheduling can take place 54 as required while the UE remains in the INACTIVE state. Once SDT is completed, and neither the gNB or UE have any further small data to transmit, the gNB can choose to keep the UE in RRC_INACTIVE state by sending RRCRelease with suspend indication 55.

Figure 4B:
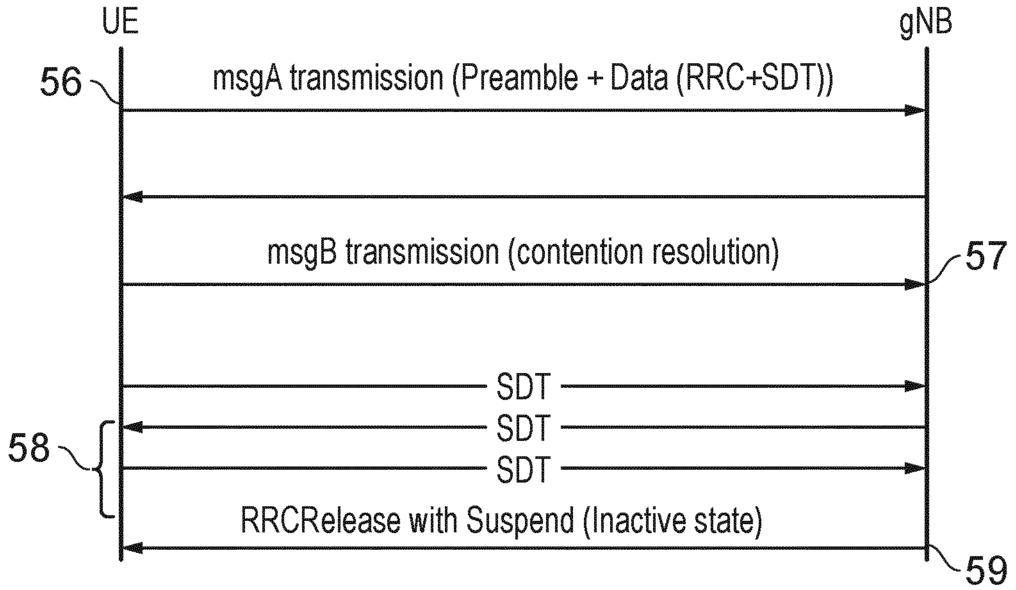

FIG. 4B shows an example of the 2-step RACH based scheme, and shows how MO SDTs can be initiated by such a scheme. When a UE has an UL SDT ready for transmission, it may start a 2-step RACH procedure as shown in FIG. 4B, which comprises the following steps:

- A UE starts msgA transmission 56 of a PRACH preamble and associated PUSCH for SDT in the current cell. The PUSCH contains RRC signaling (i.e. RRCResumeRequest for initiating an SDT) and SDT data if there is any remaining space within the PUSCH;
- Similarly to the general 2-step RACH procedure, when a gNB receives 56 msgA it identifies this as an SDT initiation and responds 57 with msgB which contains both an UL timing alignment command and the contention resolution where the UE which transmitted 56 msgA in the first step is identified and confirmed. In this step 57. DL and UL feedback or acknowledgments are transmitted:
  - For UL feedback received by a gNB from a UE in response to a DL PDSCH being transmitted by the gNB to that UE, a HARQ-ACK is transmitted by the UE on a cell-specific PUCCH resource configured within the system information; and
  - For DL feedback received by a UE from the gNB in response to msgA being transmitted 56 by that UE, the reception 57 of msgB at the UE is considered as a positive acknowledgment; and
- After the second step 57, the UE is now already identified by the network and is also UL-synchronised. Hence, subsequent UL and DL SDT with dynamic scheduling can take place 54 as required while the UE remains in the INACTIVE state. Once SDT is completed, and neither the gNB or UE have any further small data to transmit, the gNB can choose to keep the UE in RRC_INACTIVE state by sending RRCRelease with suspend indication 59.

When a UE remains in the same cell for a period of time, it is possible that the UE can use some pre-configured UL resources for transmitting data, provided that the UE is UL synchronised, while remaining in the INACTIVE state. Hence in Rel-17, it is agreed that a network can configure dedicated CG PUSCH resource(s) for SDT on a dedicated BWP or initial BWP, just before a UE moves to the RRC_INACTIVE state. The usage of CG PUSCH resources may be validated based on some criteria; for example, the UL time alignment must not have expired and DL Reference Signal Received Power (RSRP) must not have changed significantly (e.g. by less than a delta value defined by the network). In addition, there is also a DL acknowledgment (i.e. an explicit or implicit HARQ-ACK feedback) for the transmitted CG-SDT. It should be noted that it is also allowed for a UE to be scheduled with a DL PDSCH after an initial transmission using a CG PUSCH (i.e. subsequent UL and DL SDT transmissions are possible).

In the current discussion for Rel-17 [6], upon arrival of data only for data radio bearer (DRB)/signalling radio bearer(s) (SRB(s)) for which SDT is enabled, the high-level procedure for selection between SDT and non SDT procedure is as follows:

- If CG-SDT criteria is met: UE selects CG-SDT and initiates SDT procedure;
- Else, if RA-SDT criteria is met: UE selects RA-SDT and initiates SDT procedure; and
- Else: UE initiates non-SDT procedure.

The criteria for CG-SDT and RA-SDT, as identified in [6], are as follows:

- CG-SDT criteria is considered met if all of the following conditions are satisfied;
  - Available data volume is less than or equal to data volume threshold for SDT;
  - RSRP is greater than or equal to a configured threshold; and
  - CG-SDT resources are configured on the selected UL carrier and are valid; and
- RA-SDT criteria is considered met if all of the following conditions are satisfied;
  - Available data volume is less than or equal to data volume threshold for SDT;
  - RSRP is greater than or equal to a configured threshold; and
  - 4 step RA-SDT resources are configured on the selected UL carrier and criteria to select 4 step RA SDT is met: or 2 step RA-SDT resources are configured on the selected UL carrier and criteria to select 2 step RA SDT is met.

Mobile Terminated Small Data Transmission (MT SDT)

While developments for supporting Small Data Transmissions (SDT) for uplink (aka mobile originated (MO) transmissions) in Inactive state are still ongoing for Rel-17, discussions relating to the need for mobile terminated (MT) transmissions in the downlink for SDT in Rel-18 have also begun, for example for positioning services or infrequent reception of small data at a UE in the Inactive state. Possible triggering mechanisms for MT-SDT (as discussed in greater detail in co-pending European patent application published under number EP3834524 [7], the contents of which are hereby incorporated by reference) may include:

Paging message to trigger SDT transmission in the DL;

Specific dynamic DCI to trigger SDT transmission in the DL; or

Semi-persistent scheduling (SPS) configuration to trigger SDT transmission in the DL.

Figure 5:
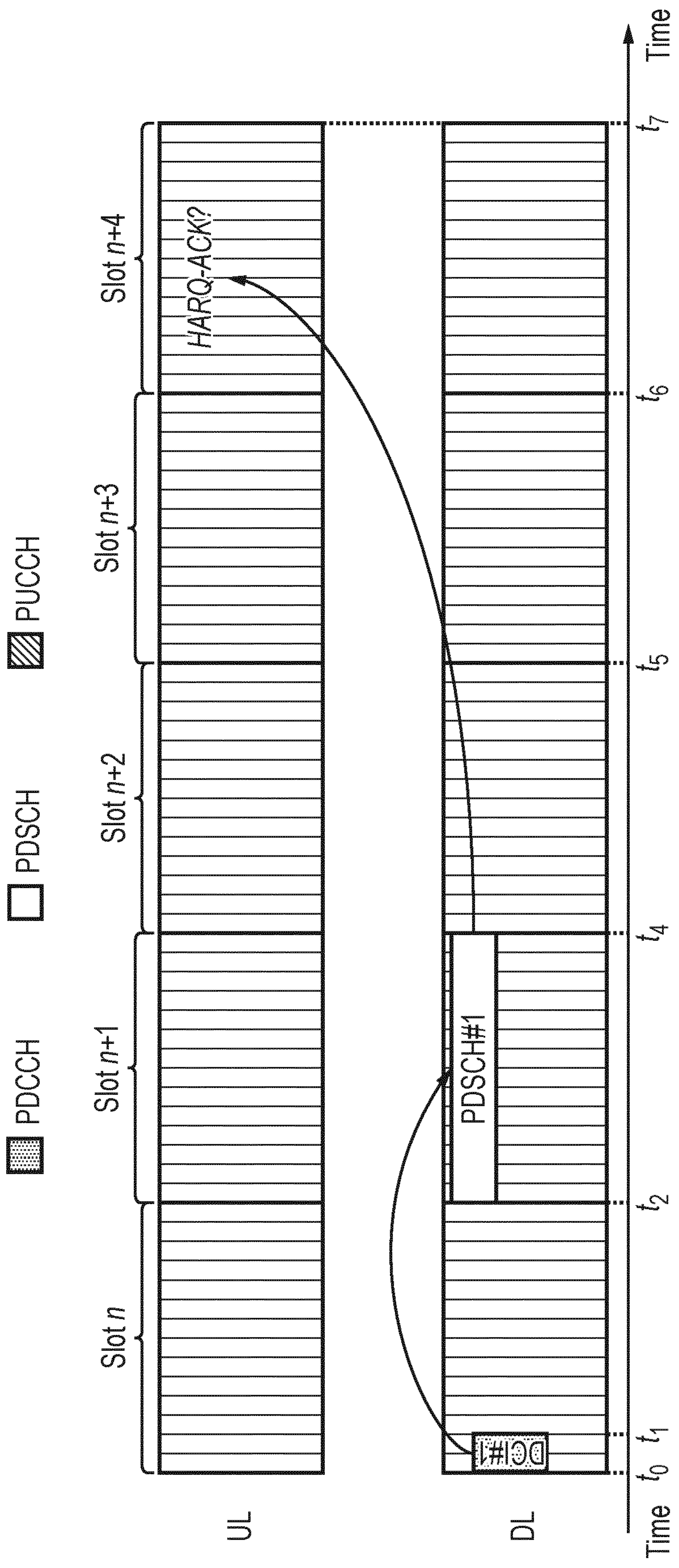
FIG. 5 illustrates how hybrid automatic repeat request acknowledgement (HARQ-ACK) resources may be undefined for a non-synchronised UE.

However, an issue to solve here is how to configure UL feedback resources for HARQ-ACK in response to DL SDT carried on a PDSCH, since the UE may not be UL-synchronised at least after receiving the first DL SDT message as shown in FIG. 5. As can be seen in FIG. 5. UE #1 is in the Inactive state, and receives DCI #1 which schedules PDSCH #1. After UE #1 decodes PDSCH #1, it does not have any UL feedback resources to transmit a HARQ-ACK in as it is not UL-synchronised. Hence, the gNB cannot determine whether PDSCH #1 is successfully received or not. Clearly, this is a problem, since the gNB will not know whether it needs to retransmit the initial SDT carried by PDSCH #1, or move on to the next SDT if it has more data to transmit.

Furthermore, in the current discussion of Rel-17, it is agreed that after a first UL SDT, it is allowed for a UE and gNB to engage in subsequent UL and DL SDT transmissions while the UE remains in the INACTIVE state. However, it is not clear where the UL feedback in response to received DL PDSCHs will be transmitted during subsequent DL SDT transmissions—i.e. whether the UL feedback should be transmitted within the existing cell-specific PUCCH or within some dedicated PUCCH resources. If the existing cell-specific PUCCH resources are re-used for both SDT and non-SDT UEs, then there is a concern that due to there being a limited number of PUCCH resources within the cell, this will result collisions between transmissions from SDT UEs and non-SDT UEs accessing the cell (i.e. inter-UEs collisions). Such collisions will prolong the access time for initial access UEs, and result in retransmissions for the SDT UEs—both of which will lead to overall delays and inefficiencies.

Figure 6:
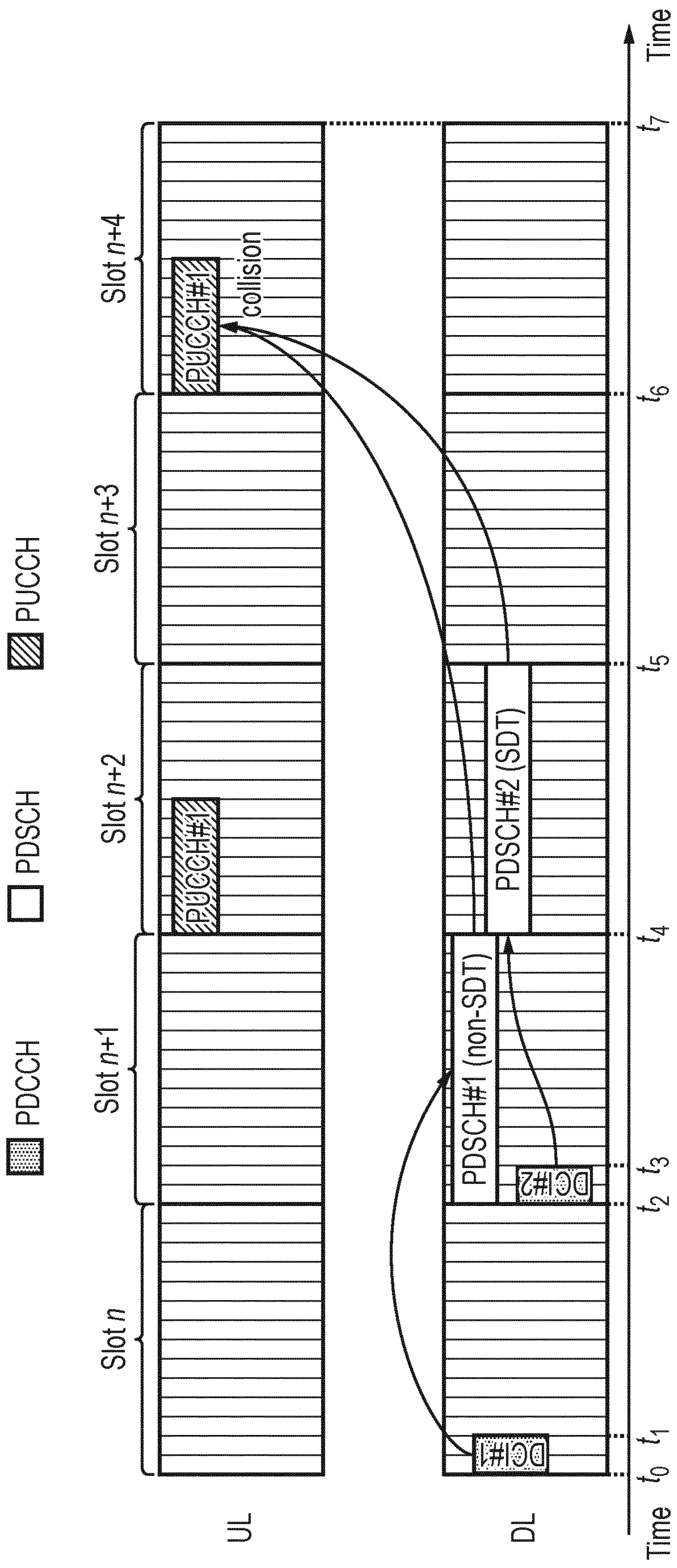
FIG. 6 illustrates how HARQ-ACKs transmitted by an SDT UE and a non-SDT UE may collide if they are both transmitted within the same cell-specific physical uplink control channel (PUCCH) resources.

As can be seen in the example of FIG. 6, a UE #1 receives DCI #1 which schedules PDSCH #1 for use in transmitting initial access messages for performing RACH procedures. After decoding PDSCH #1. UE #1 transmits UL HARQ-ACK feedback on cell-specific PUCCH #1. At the same time, a UE #2 which receives DCI #2 which schedules PDSCH #2 for DL SDT, transmits its UL HARQ-ACK feedback on the same cell specific PUCCH #1. Hence there is a collision between the UL HARQ-ACK feedback transmitted by UE #1 and UE #2.

A similar issue may occur even when the UE is performing ongoing UL/MO-SDT transmission with the network in the INACTIVE mode and during which it receives a DL/MT-SDT (for example, when the UE is UL-synchronised with the network). While in such cases the gNB may have better knowledge of where it might expect to receive UL feedback, the issue still exists of potential collisions with other UEs, such as those performing initial access.

Accordingly, a problem required to be solved is how to configure UL feedback resources for HARQ-ACK transmissions by a UE in response to the UE a DL SDT carried on a PDSCH while the UE is in the RRC_INACTIVE state. Embodiments of the present technique aim to provide solutions to such a problem.

Figure 7:
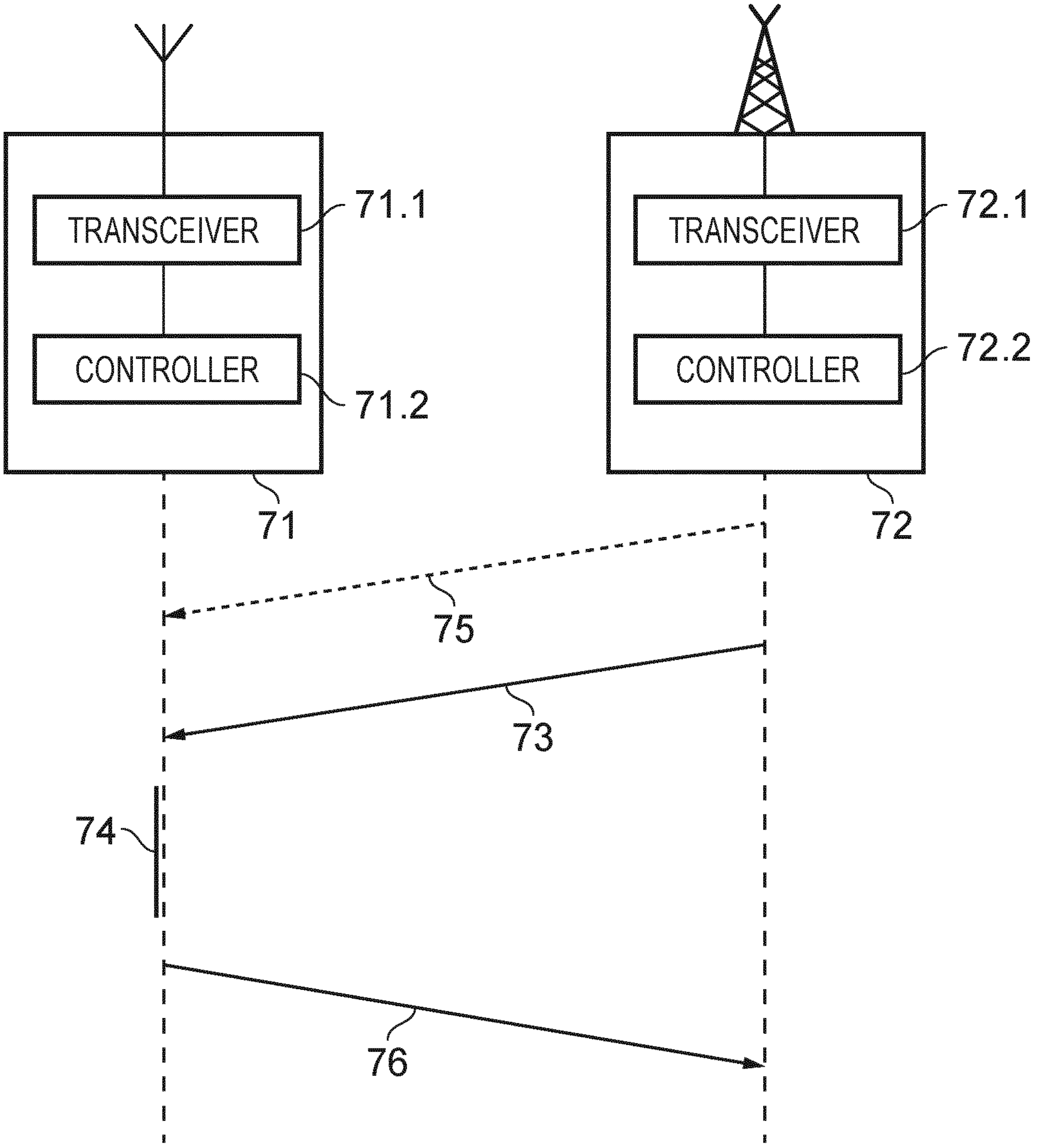
FIG. 7 shows a part schematic, part message flow diagram representation of a wireless communications system comprising a communications device and an infrastructure equipment in accordance with embodiments of the present technique.

Configuration of UL Feedback Resources for UEs Performing DL SDT in an Inactive State FIG. 7 shows a part schematic, part message flow diagram representation of a first wireless communications system comprising a communications device 71 and an infrastructure equipment 72 in accordance with at least some embodiments of the present technique. The communications device 71 is configured to transmit signals to and/or receive signals from the wireless communications network, for example, to and from the infrastructure equipment 72. Specifically, the communications device 71 may be configured to transmit data to and/or receive data from the wireless communications network (e.g. to/from the infrastructure equipment 72) via a wireless radio interface provided by the wireless communications network (e.g. a Uu interface between the communications device 71 and the Radio Access Network (RAN), which includes the infrastructure equipment 72). The communications device 71 and the infrastructure equipment 72 each comprise a transceiver (or transceiver circuitry) 71.1, 72.1, and a controller (or controller circuitry) 71.2, 72.2. Each of the controllers 71.2, 72.2 may be, for example, a microprocessor, a CPU, or a dedicated chipset, etc.

As shown in the example of FIG. 7, the transceiver circuitry 71.1 and the controller circuitry 71.2 of the communications device 71 are configured in combination, while the communications device is operating in an inactive state, to receive 73, from the wireless communications network (e.g. from the infrastructure equipment 72), a small data transmission. SDT, within a set of downlink resources of the wireless radio interface, determining 74, based on a configuration indicated by signalling information (which may be for example carried by a system information block (SIB)) received 75 from the wireless communications network (e.g. from the infrastructure equipment 72) previously to the SDT 73, a set of uplink resources of the wireless radio interface, and transmitting 76, to the wireless communications network (e.g. to the infrastructure equipment 72) in the determined set of uplink resources, a feedback signal in response to the received SDT.

Essentially, embodiments of the present technique propose that the network is to configure an UL feedback resource on a BWP for a UE performing DL SDT in INACTIVE state, e.g. HARQ-ACK feedback (ACK or NACK) corresponding to the DL PDSCH carrying the DL/MT SDT from the network.

Such an UL feedback resource may alternatively/additionally be for a UE to feedback channel state information (CSI) if instructed to do so. Broadly, there are two different scenarios that may determine what kind of resources are applicable; when the UE is UL-synchronised with the network, and when the UE is not UL-synchronised with the network.

A UE may not be UL-synchronised with the network when it has just received the first DL SDT (e.g. on a PDSCH). Here, embodiments of the present technique provide solutions to how the UE may transmit HARQ-ACK feedback for the DL SDT in the uplink on a BWP. If a UE is not UL-synchronised, then it cannot generally transmit a PUCCH or PUSCH in the uplink due to the possibility of interference between users transmitting in the uplink. As described above, the principle of OFDMA as utilised by NR systems is that uplink transmissions from all users must arrive at the same time (i.e. they must be synchronised) at the gNB receiver. A UE that is farther from the gNB must transmit earlier than a UE located closer to the gNB to ensure that their transmissions arrive at the same time due to different RF propagation delays.

NR technologies allow for PRACH transmissions when a UE is not UL-synchronised. After receiving a PRACH preamble, the network sends a timing advance command to the UE to control its uplink transmission timing, which as described above is mainly used for PUSCH. PUCCH and SRS. Based on this principle, several feedback methods, described below, using different combinations of channels can be utilised to carry the UL feedback for a DL/MT SDT.

Figure 8:
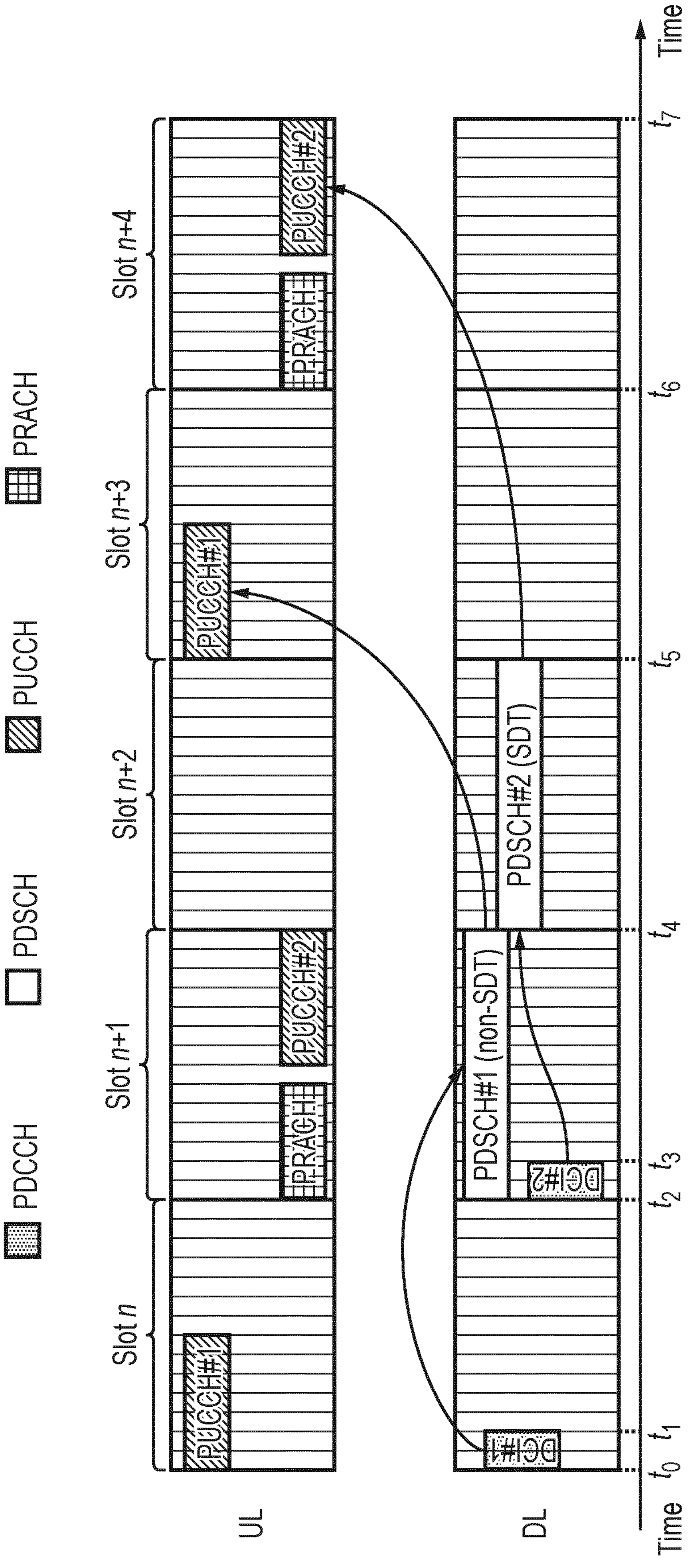
FIG. 8 shows an example of separate physical random access channel (PRACH) and PUCCH resources for uplink SDT feedback in accordance with embodiments of the present technique.

One such method, in some arrangements of embodiments of the present technique, comprises the transmission of both a PRACH and a PUCCH. In this case, a UE transmits a PRACH followed by a PUCCH resource (PUCCH #2) in slot n. 4 in the time domain as shown in FIG. 8. The network will use the preamble carried by the PRACH to determine the uplink time alignment value that will be used by the UE, and will then itself use this uplink time alignment value for decoding PUCCH #2 when this is received from the UE. It is assumed here that the PRACH resources used by the UE are separately configured from the legacy PRACH resources on a BWP, so that the gNodeB can easily identify "PRACH+PUCCH" for SDT feedback. In other words, the communications device may be configured to receive the signalling information from the wireless communications network (e.g. from an infrastructure equipment) either while the communications device is operating in the inactive state or while the communications device is operating in a connected state and before the communications device transitions to the inactive state, to select, based on the configuration indicated by the signalling information, one of a plurality of preambles, the selected preamble being associated with the determined set of uplink resources and indicating the set of uplink resources in which the feedback signal will be transmitted, and to transmit, to the wireless communications network (e.g. to an infrastructure equipment) before transmitting the feedback signal, the selected preamble, where here, the determined set of uplink resources may be a physical uplink control channel. PUCCH.

The mapping between PRACH preambles and different sets of possible PUCCH resources may be pre-specified in a BWP specific manner. Therefore, when a UE selects a specific preamble index, it also knows which PUCCH resource to use for UL feedback. The periodicity and occasions of the PRACH+PUCCH resources can be predefined in a BWP for all inactive UEs—for example, in the example shown by FIG. 8, the periodicity is every three slots (the previous occasions of the PRACH+PUCCH resources are shown in slot n+1, while the occasions used by the UE for transmitting the preamble and feedback are located in slot n+4 as described above).

Figure 9:
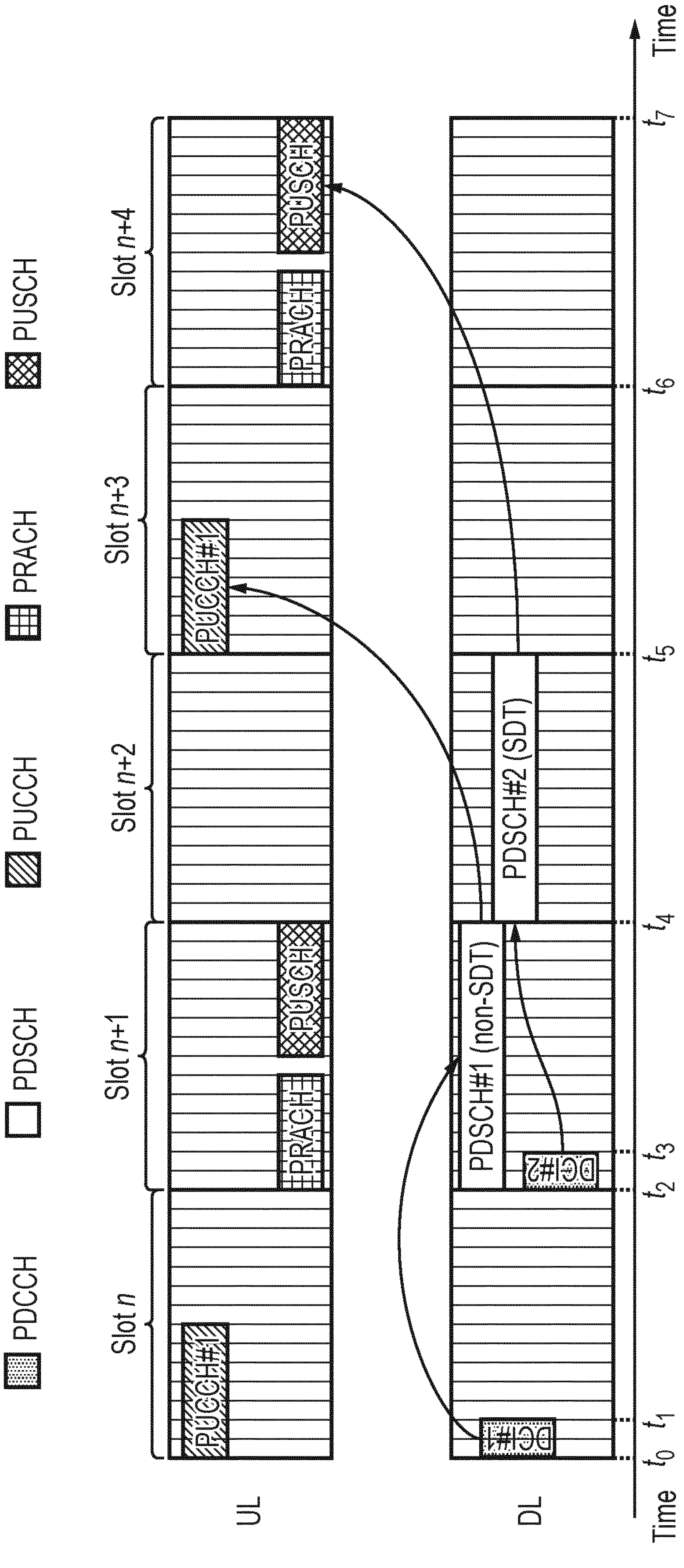
FIG. 9 shows an example of separate PRACH and physical uplink shared channel (PUSCH) resources for uplink SDT feedback in accordance with embodiments of the present technique.

Another such method, in some arrangements of embodiments of the present technique, comprises (similar to the 2-step RACH procedure as described above) the transmission by a UE of a PRACH and a PUSCH. In this case, as is shown in the example of FIG. 9, the UE transmits a PRACH followed by a PUSCH resource slot n+4 in the time domain as shown in FIG. 9. The network will use the preamble carried by the PRACH to determine the uplink time alignment value that will be used by the UE, and will then itself use this uplink time alignment value for decoding the PUSCH when this is received from the UE later in slot n+4. It is assumed here that the PRACH resources used by the UE are separately configured from the legacy PRACH resources on a BWP so that the gNodeB can identify "PRACH+PUSCH" for SDT feedback. In other words, the communications device may be configured to receive the signalling information from the wireless communications network (e.g. from an infrastructure equipment) either while the communications device is operating in the inactive state or while the communications device is operating in a connected state and before the communications device transitions to the inactive state, to select, based on the configuration indicated by the signalling information, one of a plurality of preambles, the selected preamble being associated with the determined set of uplink resources, and to transmit, to the wireless communications network (e.g. to an infrastructure equipment) before transmitting the feedback signal, the selected preamble, where here, the determined set of uplink resources may be a physical uplink shared channel, PUSCH. In this option, the PUSCH may carry, in addition (or alternatively) to any HARQ-ACK feedback for DL PDSCH response. UL SDT data and/or CSI reports, if it has any to transmit, where the feedback and UL SDT data—if the UE has both to transmit—can be multiplexed into the same PUSCH resource.

Similarly, the above arrangements described with respect to the example FIG. 8, the mapping between PRACH preambles and a set of PUSCH resources may be pre-specified in a BWP specific manner. Therefore, when a UE selects a specific preamble index, it also knows which PUSCH resource to use for UL feedback. This could be achieved in the same way as a 2-step RACH procedure, where there is a pre-defined mapping between PRACH preambles and different sets of PUSCH resources in Rel-16. Again here, the periodicity and occasions of the PRACH+PUSCH resources can be predefined in a BWP for all inactive UEs—for example, in the example shown by FIG. 9, the periodicity is again every three slots (the previous occasions of the PRACH+PUSCH resources are shown in slot n+1 while the occasions used by the UE for transmitting the preamble and feedback are located in slot n+4 as described above).

Another such method, in some arrangements of embodiments of the present technique, comprises the transmission by a of a PRACH only, where the PRACH includes a known preamble that also represents the HARQ-ACK feedback for the received DL SDT. Similarly, to those methods as described above with reference to FIGS. 8 and 9, the UE here is configured with PRACH resources in a BWP. The gNB would then try to detect the known preamble at the configured BWP to receive the UE's feedback. In other words, the determined set of uplink resources is a physical random access channel. PRACH, and wherein the transmission of the selected preamble represents/indicates the feedback signal. For example, if the network receives the PRACH preamble, this indicates positive feedback (ACK), whereas if the network does not receive any PRACH preamble, then this implies negative feedback (NACK). Alternatively, the UE may transmit one PRACH preamble to represent an ACK and another to represent a NACK.

Those skilled in the art would appreciate that the above three methods for UEs that are not UL-synchronised (PRACH+PUCCH. PRACH+PUSCH, PRACH only) may be implemented in either an individual or a combined manner. That is, the network may configure any one of these methods for a UE, where this configuration may change such that another method is configured for the UE at a later time.

In those arrangements described above where the UE is not UL-synchronised with the network, the particular preamble that the UE uses for the feedback can be determined using one or more of the following arrangements of embodiments of the present disclosure:

- The DCI scheduling the DL PDSCH indicates the preamble index;
- The preamble index is configured as part of SDT configuration; and
- The RNTI used by the DL DCI is linked to a preamble index.

In other words, the communications device may be configured to select the selected preamble from the plurality of preambles based on one or more of: the configuration indicated by the signalling information, an indication carried by a downlink control signal, and an identifier of the downlink control signal, where this downlink control signal is received from the wireless communications network prior to receiving the SDT and indicates the set of downlink resources in which the SDT is to be received.

In those arrangements described above where the UE is not UL-synchronised with the network, a UE upon detection of the DCI carried by a PDDCH for triggering SDT at DL slot n may perform PRACH transmission in the first slot from $n+k_2$, where $k_2 \geq x$, where a PRACH resource is available, and x is a known value e.g. 1 or 2 or 3 or 4. In other words, the communications device may be configured to transmit the selected preamble within a first available PRACH that is located a specified number of time units of the wireless radio interface from the location of a downlink control signal, where this downlink control signal is received from the wireless communications network prior to receiving the SDT and indicates the set of downlink resources in which the SDT is to be received. It should be noted the timing relationship between the PRACH and the PUCCH/PUSCH may be fixed in the specification based on a pre-defined mapping scheme of PRACH preambles and PUCCH/PUSCH as mentioned earlier.

In another arrangement of embodiments of the present disclosure, the network can configure a UE with two different resources: one for UL feedback only and another for UL feedback plus UL SDT data. Hence if a UE has UL SDT data to transmit, then it can multiplex UL feedback with the SDT data and transmit it in the same resource. In other words, the communications device may be configured to determine the set of uplink resources in accordance with whether or not the communications device has an uplink SDT to transmit to the wireless communications network in addition to the feedback signal. In this case, for example, the resource to use for transmitting only UL feedback could be PRACH+PUCCH, whilst UL feedback plus UL SDT data must be transmitted using PRACH+PUSCH.

A UE may be UL-synchronised with the network in various scenarios; for example, when it already has an ongoing UL SDT being performed with the network. At the same time as this, the UE may receive DL SDT data (via a PDSCH), and then must transmit HARQ-ACK feedback for this DL SDT data in the uplink. When a UE which is required to transmit HARQ-ACK feedback for a DL SDT is UL synchronised, several feedback methods, as described below, may be utilised for the transmission of the UL feedback for this DL/MT SDT.

Figure 10:
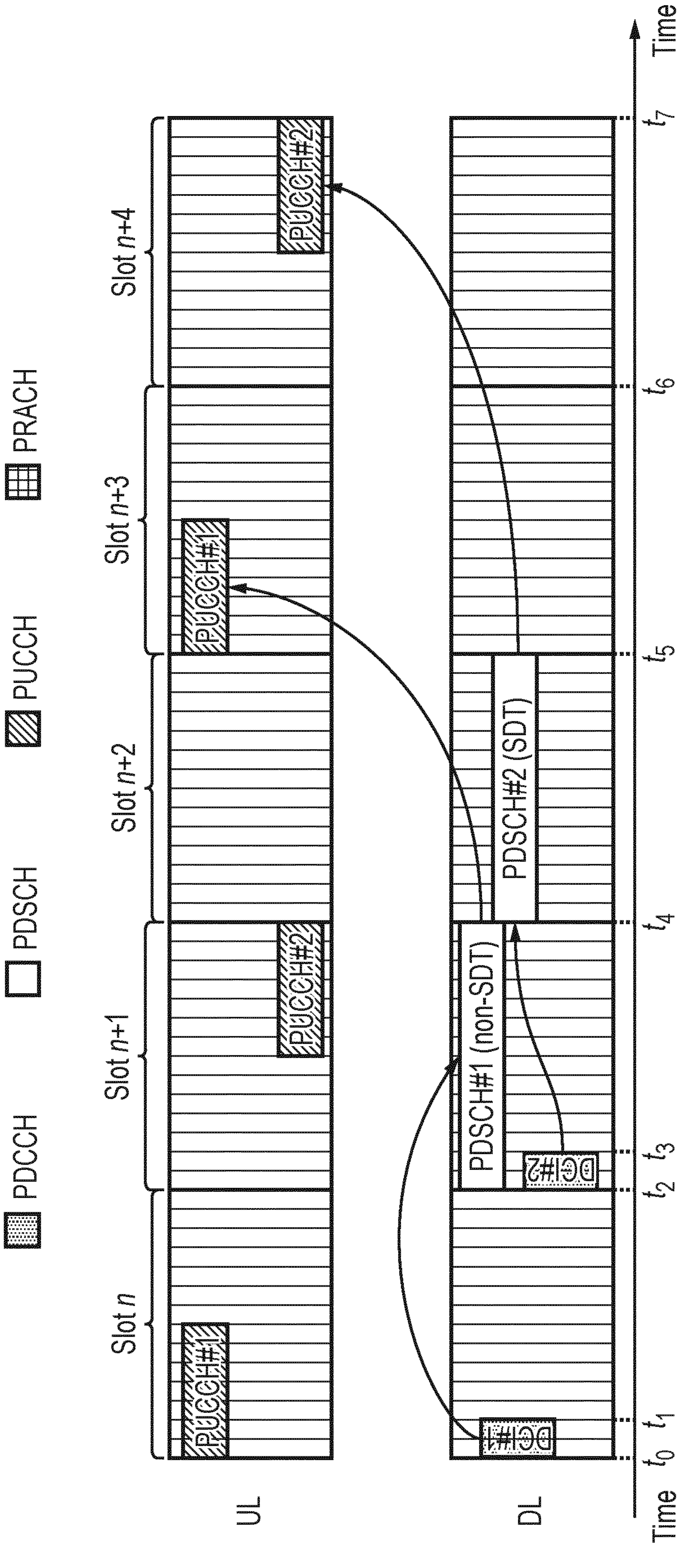
FIG. 10 shows how dedicated PUCCH resource may be used by SDT UEs for transmitting uplink feedback in accordance with embodiments of the present technique.

One such method, in some arrangements of embodiments of the present technique, comprises using a dedicated PUCCH resource for a UE in an inactive state. Here, the network may configure a dedicated PUCCH resource just before the UE moves to the RRC_INACTIVE state (i.e. RRCRelease with suspend) on a dedicated BWP or an initial BWP for a UE to use for UL feedback in the latest serving cell as shown in the example of FIG. 10. In other words, the communications device may be configured to receive the signalling information from the wireless communications network while the communications device is operating in a connected state and before the communications device transitions to the inactive state, where here, the determined set of uplink resources is a physical uplink control channel. PUCCH.

In the example of FIG. 10, this dedicated PUCCH resource is PUCCH #2, and it is within PUCCH #2 that the UE transmits the feedback for the DL SDT in slot n. 4 in the example of FIG. 10. Hence, this resource is valid only if the UE is still in the same cell as before moving to the INACTIVE state, and also if the UE is still UL-synchronised. In order the UE to be considered as UL-synchronised, the time alignment (TA) must be valid, e.g. the TA timer must not have expired. The TA timer is used at both the UE and the network in order to ensure that they are aligned with each other. If the TA timer expires, the PUCCH resources will be released.

Furthermore, the DCI that schedules the PDSCH which carries the DL SDT can indicate explicitly which PUCCH resource (if there are multiple PUCCH resources available, or a particular occasion of a PUCCH resource with a certain periodicity) to use at any given time, e.g. using the $K_1$ value where the value of $K_1$ is indicated in the field "PDSCH-to-HARQ_feedback timing indicator" of the DL DCI that schedules the PDSCH. In other words, the PUCCH may be one of a plurality of available PUCCH resources and which is (either explicitly or implicitly) indicated by a downlink control signal received from the wireless communications network prior to receiving the SDT, wherein the downlink control signal indicates the set of downlink resources in which the SDT is to be received. Here, this plurality of available PUCCH resources may have been indicated by the configuration indicated by the signalling information (e.g. SIB) upon the basis of which the communications device determined the set of uplink resources.

Figure 11:
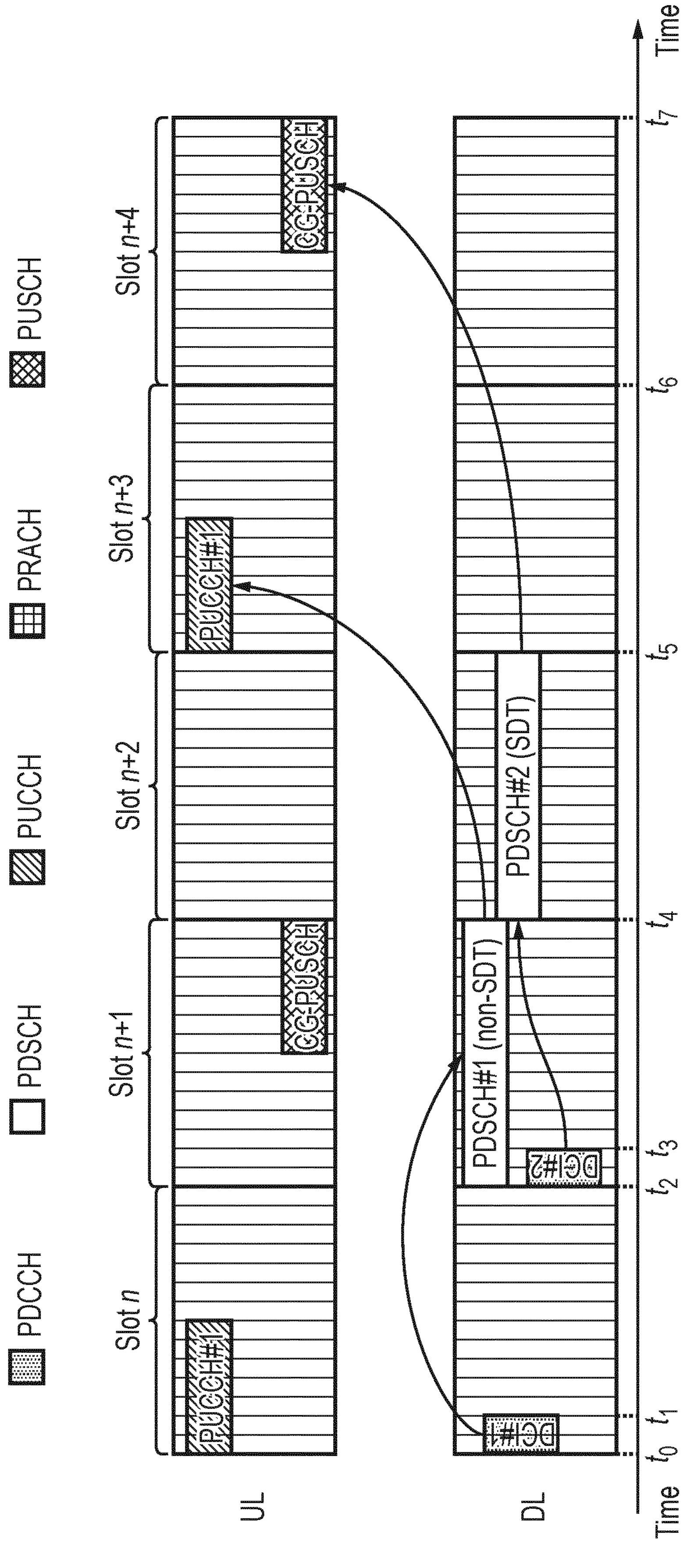
FIG. 11 shows how configured grant (CG)-PUSCH resources may be used by SDT UEs for transmitting uplink feedback in accordance with embodiments of the present technique.

Another such method, in some arrangements of embodiments of the present technique, comprises using a dedicated CG-PUSCH resource for a UE in an inactive state. In the current SDT discussions in Rel-17, it has already been agreed that a network is to configure a dedicated CG-PUSCH resource(s) for SDT just before a UE moves to the RRC Inactive state (i.e. RRCRelease with suspend). This dedicated CG-PUSCH resource(s) can be configured on a dedicated BWP or initial BWP and it is a known solution for this to be used for uplink SDT transmission. However, presently, such a dedicated CG-PUSCH resource(s) has not been proposed to carry any feedback for DL-SDT data. Hence, in such arrangements of embodiments of the present technique, a dedicated CG-PUSCH resource can be configured to carry UL feedback in the latest serving cell as shown in FIG. 11 (here, in this example, this resource is the CG-PUSCH transmitted in slot n+4); again, as long as the TA is valid in the same manner as described above with respect to the example described with reference to FIG. 10. In other words, the communications device may be configured to receive the signalling information from the wireless communications network while the communications device is operating in a connected state and before the communications device transitions to the inactive state, where here, the determined set of uplink resources is a configured grant physical uplink shared channel. CG-PUSCH.

Assuming the UE has UL SDT data to transmit, this data and the UL feedback for the DL SDT can be multiplexed together in one or more of the available CG-PUSCHs. In other words, the communications device may be configured to transmit both the feedback signal and an uplink SDT to the wireless communications network within the CG-PUSCH. This feedback may be, for example, carried in the form of a CG-UCI. However, if only UL feedback is available, the CG-PUSCH can still carry this feedback information alone.

If more than one CG-PUSCH is available, then it must be specified which one of these is to carry the UL feedback, so that the UE and the network are aligned in their understanding of the location of the UL feedback information. Some methods to define which CG resource may carry the UL feedback, in accordance with arrangements of embodiments of the present disclosure are as follows:

- The earliest CG resource that is available after UE receives the DL PDSCH;
- The CG resource with the lowest index;
- The CG resource with the highest index;
- The CG resource with the smallest periodicity;
- The CG resource with the highest periodicity;
- The CG resource with the largest resource;
- DCI scheduling PDSCH indicates which CG resource to use at a given time, e.g. using $K_1$ value where the value of $K_1$ is indicated in the field "PDSCH-to-HARQ_feedback timing indicator" of the DL DCI;
- RRC configures in advance which CG resource to use;
- The UL feedback is repeated over multiple CG resources in time-domain;
- The CG resource that is selected for data transmission (here the feedback may be piggybacked onto it in the form of CG-UCI); or
- Any combination of the above methods.

In other words, the determined CG-PUSCH is one of a plurality of available CG-PUSCHs, and the determined CG-PUSCH may be one or more of: the earliest available CG-PUSCH from among the plurality of available CG-PUSCHs following reception of the SDT, that which has a lowest index value from among the plurality of available CG-PUSCHs, that which has a highest index value from among the plurality of available CG-PUSCHs, that which has a lowest periodicity from among the plurality of available CG-PUSCHs, that which has a highest periodicity from among the plurality of available CG-PUSCHs, that which is formed from the largest amount of resources from among the plurality of available CG-PUSCHs, that which is indicated by a downlink control signal received from the wireless communications network prior to receiving the SDT, wherein the downlink control signal indicates the set of downlink resources in which the SDT is to be received, that which is indicated by Radio Resource Control. RRC, signalling received from the wireless communications network, and that which contains uplink data. Here, alternatively or in addition to any of the above methods, the communications device may be configured to repeat transmission of the feedback signal in one or more subsequent CG-PUSCHs of the plurality of available CG-PUSCHs following the determined CG-PUSCH.

Those skilled in the art would appreciate that, in the same manner as described above for the methods for UEs that are not UL-synchronised, the above methods for UEs that are UL-synchronised (PUCCH or CG-PUSCH) may be implemented in either an individual or a combined manner. That is, the network may configure either of these methods for a UE, where this configuration may change such that another method is configured for the UE at a later time. Clearly, in this case, the specifications must define the conditions of which option to be used at a given time. For example, in an arrangement of embodiments of the present technique, the specifications may define that a PUCCH resource is always used, except if the PUCCH collides with a CG-PUSCH resource. In this case, if the PUCCH collides with a CG-PUSCH resource, the specifications may define in an arrangement of embodiments of the present technique that the UE must multiplex data and UL feedback in the CG-PUSCH resource. Furthermore, such methods may be implemented for UL-synchronised UEs in either an individual or a combined manner as described here in addition to those methods described above for UEs that are not UL-synchronised. Here, a UE will be configured to transmit UL feedback for DL SDTs in at least two different manners, which it selects from based at least in part on whether it is UL-synchronised or not UL-synchronised. For example, a UE may be configured to send UL feedback via a PRACH and PUSCH if it is not UL-synchronised, but via a CG-PUSCH if it is UL-synchronised. Such configurations may be changed by the network at appropriate times.

In another arrangement of embodiments of the present disclosure, similarly as for non-UL-synchronised UEs as described above, the network can configure an UL-synchronised UE with two different resources: one for UL feedback only and another for UL feedback plus UL SDT data. Hence if a UE has UL SDT data to transmit, then it can multiplex UL feedback with the SDT data and transmit it in the same resource. In other words, the communications device may be configured to determine the set of uplink resources in accordance with whether or not the communications device has an uplink SDT to transmit to the wireless communications network in addition to the feedback signal.

Figure 12:
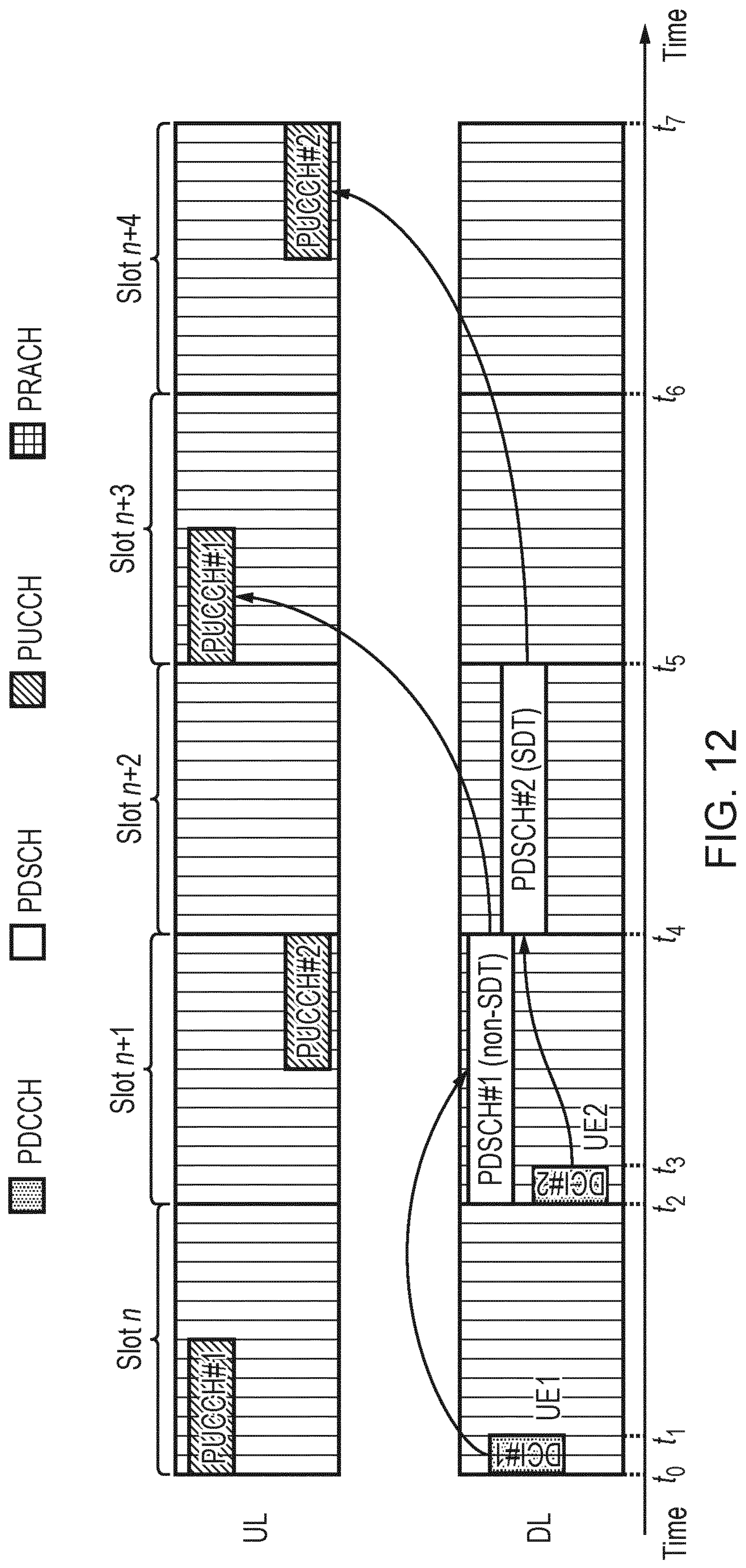
FIG. 12 shows how separate PUCCH resources may be configured for SDT UEs and non-SDT UEs in accordance with embodiments of the present technique.

As described above, it is possible that there could be feedback collisions for SDT and non-SDT UEs (i.e. inter-UEs collisions). For example, this might happen when a UE has already an ongoing UL SDT but at the same the UE receives DL SDT data (via a PDSCH) and the UE must transmit HARQ-ACK feedback (for the received PDSCH) in the uplink on the initial BWP. Hence, to avoid the collisions, it is proposed here that a UE—depending on whether or not it is performing SDT with the network while in an inactive mode—is configured with one of the following PUCCH resource candidates (as illustrated in the example of FIG. 12):

- A cell specific PUCCH resources for all UEs performing SDT-which is not the same as the cell specific PUCCH resource for initial access UEs. The configuration of such a cell specific PUCCH may be conveyed via a SDT system information block (SIB). In the example of FIG. 12, this is PUCCH #1 (which has a periodicity of three slots and has occasions in slot n and slot n+3); or
- A dedicated PUCCH resource for a UE configured in message 4/msgB (in RRC message). In the example of FIG. 12, this is PUCCH #2 (which also has a periodicity of three slots and has occasions in slot n+1 and slot n+4):

In other words, the determined set of uplink resources may be a set of cell-specific uplink resources which is only for use by communications devices operating in the inactive state and performing SDT with the wireless communications network. A different set of dedicated uplink resources which are only for use by communications devices performing initial access/RACH procedures with the wireless communications network will differ to these cell-specific uplink resources, and thus would help mitigate feedback collisions between SDT and non-SDT UEs.

Figure 13:
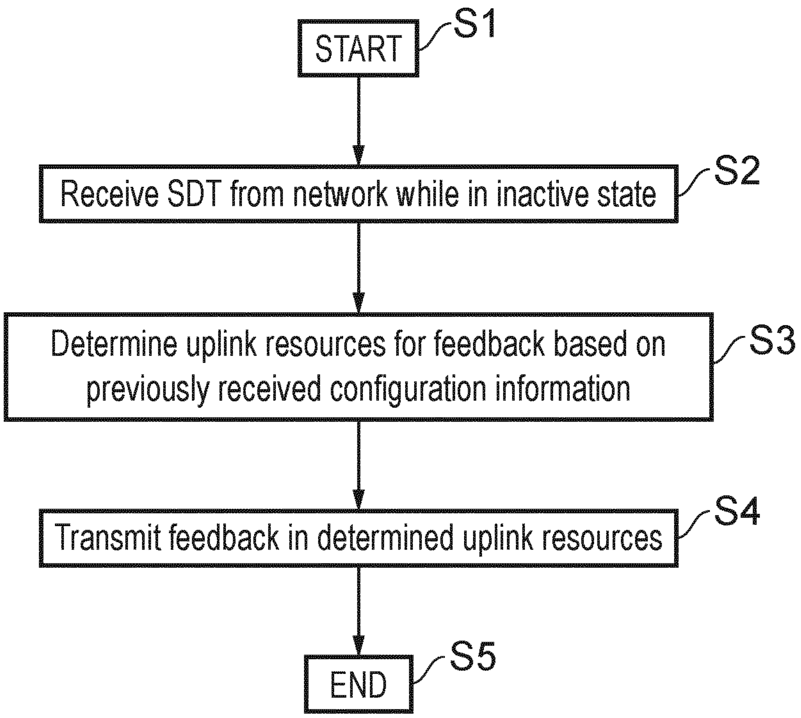
FIG. 13 shows a flow diagram illustrating a process of communications in a communications system in accordance with embodiments of the present technique.

FIG. 13 shows a flow diagram illustrating an example process of communications in a communications system in accordance with embodiments of the present technique. The process shown by FIG. 13 is a method of operating a communications device configured to transmit signals to and/or to receive signals from a wireless communications network (e.g. to or from an infrastructure equipment of the wireless communications network).

The method, which is performed while the communications device is operating in an inactive state, begins in step S1. The method comprises, in step S2, receiving, from the wireless communications network, a small data transmission, SDT, within a set of downlink resources of the wireless radio interface. In step S3, the process comprises determining, based on a configuration indicated by signalling information received from the wireless communications network previously to the SDT, a set of uplink resources of the wireless radio interface. The method then comprises, in step S4, transmitting, to the wireless communications network in the determined set of uplink resources, a feedback signal in response to the received SDT. The process ends in step S5.

Those skilled in the art would appreciate that the method shown by FIG. 13 may be adapted in accordance with embodiments of the present technique. For example, other intermediate steps may be included in this method, or the steps may be performed in any logical order. Though embodiments of the present technique have been described largely by way of the example communications system shown in FIG. 7, and described by way of the arrangements shown by FIGS. 8 to 12, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may, without departing from the scope of the claims, form part of communications systems other than those defined by the present disclosure.

The following numbered paragraphs provide further example aspects and features of the present technique:

Paragraph 1. A method of operating a communications device configured to transmit signals to and/or to receive signals from a wireless communications network via a wireless radio interface provided by the wireless communications network, the method comprising, while the communications device is operating in an inactive state, receiving, from the wireless communications network, a small data transmission. SDT, within a set of downlink resources of the wireless radio interface.

determining, based on a configuration indicated by signalling information received from the wireless communications network previously to the SDT, a set of uplink resources of the wireless radio interface, and transmitting, to the wireless communications network in the determined set of uplink resources, a feedback signal in response to the received SDT.

Paragraph 2. A method according to Paragraph 1, comprising receiving the signalling information from the wireless communications network either while the communications device is operating in the inactive state or while the communications device is operating in a connected state and before the communications device transitions to the inactive state.

selecting, based on the configuration indicated by the signalling information, one of a plurality of preambles, the selected preamble being associated with the determined set of uplink resources and indicating the set of uplink resources in which the feedback signal will be transmitted, and transmitting, to the wireless communications network before transmitting the feedback signal, the selected preamble.

Paragraph 3. A method according to Paragraph 2, wherein the signalling information comprises an indication of the association between the selected preambles and one or more sets of available uplink resources.

Paragraph 4. A method according to Paragraph 2 or Paragraph 3, wherein the determined set of uplink resources is a physical uplink control channel. PUCCH.

Paragraph 5. A method according to any of Paragraphs 2 to 4, wherein the determined set of uplink resources is a physical uplink shared channel, PUSCH.

Paragraph 6. A method according to any of Paragraphs 2 to 5, wherein the determined set of uplink resources is a physical random access channel. PRACH, and wherein the selected preamble indicates the feedback signal.

Paragraph 7. A method according to any of Paragraphs 2 to 6, comprising selecting the selected preamble from the plurality of preambles based on the configuration indicated by the signalling information.

Paragraph 8. A method according to any of Paragraphs 2 to 7, comprising receiving, from the wireless communications network prior to receiving the SDT, a downlink control signal that indicates the set of downlink resources in which the SDT is to be received.

Paragraph 9. A method according to Paragraph 8, comprising selecting the selected preamble from the plurality of preambles based on an indication carried by the downlink control signal.

Paragraph 10. A method according to Paragraph 8 or Paragraph 9, comprising selecting the selected preamble from the plurality of preambles based on an identifier of the downlink control signal.

Paragraph 11. A method according to any of Paragraphs 8 to 10, comprising transmitting the selected preamble within a first available PRACH that is located a specified number of time units of the wireless radio interface from the location of the downlink control signal.

Paragraph 12. A method according to any of Paragraphs 2 to 11, comprising determining the set of uplink resources in accordance with whether or not the communications device has an uplink SDT to transmit to the wireless communications network in addition to the feedback signal.

Paragraph 13. A method according to Paragraph 1, comprising receiving the signalling information from the wireless communications network while the communications device is operating in a connected state and before the communications device transitions to the inactive state.

Paragraph 14. A method according to Paragraph 13, wherein the determined set of uplink resources is a physical uplink control channel. PUCCH.

Paragraph 15. A method according to Paragraph 14, wherein the PUCCH is one of a plurality of available PUCCH resources and is indicated by a downlink control signal received from the wireless communications network prior to receiving the SDT, wherein the downlink control signal indicates the set of downlink resources in which the SDT is to be received.

Paragraph 16. A method according to Paragraph 15, wherein the plurality of available PUCCH resources are indicated by the configuration indicated by the signalling information.

Paragraph 17. A method according to any of Paragraphs 13 to 16, wherein the determined set of uplink resources is a configured grant physical uplink shared channel. CG-PUSCH.

Paragraph 18. A method according to Paragraph 17, comprising transmitting both the feedback signal and an uplink SDT to the wireless communications network within the CG-PUSCH.

Paragraph 19. A method according to Paragraph 17 or Paragraph 18, wherein the determined CG-PUSCH is one of a plurality of available CG-PUSCHs.

Paragraph 20. A method according to Paragraph 19, wherein the determined CG-PUSCH is the earliest available CG-PUSCH from among the plurality of available CG-PUSCHs following reception of the SDT.

Paragraph 21. A method according to Paragraph 19 or Paragraph 20, wherein the determined CG-PUSCH has a lowest index value from among the plurality of available CG-PUSCHs.

Paragraph 22. A method according to any of Paragraphs 19 to 21, wherein the determined CG-PUSCH has a highest index value from among the plurality of available CG-PUSCHs.

Paragraph 23. A method according to any of Paragraphs 19 to 22, wherein the determined CG-PUSCH has a lowest periodicity from among the plurality of available CG-PUSCHs.

Paragraph 24. A method according to any of Paragraphs 19 to 23, wherein the determined CG-PUSCH has a highest periodicity from among the plurality of available CG-PUSCHs.

Paragraph 25. A method according to any of Paragraphs 19 to 24, wherein the determined CG-PUSCH is formed from the largest amount of resources from among the plurality of available CG-PUSCHs.

Paragraph 26. A method according to any of Paragraphs 19 to 25, wherein the determined CG-PUSCH contains data.

Paragraph 27. A method according to any of Paragraphs 19 to 26, wherein the determined CG-PUSCH is indicated by a downlink control signal received from the wireless communications network prior to receiving the SDT, wherein the downlink control signal indicates the set of downlink resources in which the SDT is to be received.

Paragraph 28. A method according to any of Paragraphs 19 to 27, wherein the determined CG-PUSCH is indicated by Radio Resource Control. RRC, signalling received from the wireless communications network.

Paragraph 29. A method according to any of Paragraphs 19 to 28, comprising repeating transmission of the feedback signal in one or more subsequent CG-PUSCHs of the plurality of available CG-PUSCHs following the determined CG-PUSCH.

Paragraph 30. A method according to any of Paragraphs 1 to 29, comprising determining the set of uplink resources in accordance with whether or not the communications device has an uplink SDT to transmit to the wireless communications network in addition to the feedback signal.

Paragraph 31. A method according to any of Paragraphs 1 to 30, wherein the determined set of uplink resources is a set of cell-specific uplink resources which is only for use by communications devices operating in the inactive state and performing SDT with the wireless communications network.

Paragraph 32. A communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry, while the communications device is operating in an inactive state.

to receive, from the wireless communications network, a small data transmission, SDT, within a set of downlink resources of the wireless radio interface.

to determine, based on a configuration indicated by signalling information received from the wireless communications network previously to the SDT, a set of uplink resources of the wireless radio interface, and to transmit, to the wireless communications network in the determined set of uplink resources, a feedback signal in response to the received SDT.

Paragraph 33. Circuitry for a communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry, while the communications device is operating in an inactive state.

to receive, from the wireless communications network, a small data transmission. SDT, within a set of downlink resources of the wireless radio interface.

to determine, based on a configuration indicated by signalling information received from the wireless communications network previously to the SDT, a set of uplink resources of the wireless radio interface, and to transmit, to the wireless communications network in the determined set of uplink resources, a feedback signal in response to the received SDT.

Paragraph 34. A method of operating an infrastructure equipment forming part of a wireless communications network configured to transmit signals to and/or to receive signals from a communications device via a wireless radio interface provided by the infrastructure equipment, the method comprising.

transmitting, to the communications device, signalling information indicating a configuration for transmitting feedback in response to the communications device receiving small data transmissions. SDTs, transmitting, to the communications device while the communications device is operating in an inactive state, an SDT within a set of downlink resources of the wireless radio interface, and receiving, from the communications device while the communications device is operating in the inactive state, a feedback signal in response to the transmitted SDT, wherein the feedback signal is received in a set of uplink resources indicated by the configuration indicated by the signalling information.

Paragraph 35. A method according to Paragraph 34, comprising transmitting the signalling information to the communications device either while the communications device is operating in the inactive state or while the communications device is operating in a connected state and before the communications device transitions to the inactive state, and receiving, from the communications device before receiving the feedback signal, one of a plurality of preambles, wherein the received preamble is associated with the determined set of uplink resources and indicates the set of uplink resources in which the feedback signal will be received.

Paragraph 36. A method according to Paragraph 35, wherein the signalling information comprises an indication of the association between the selected preambles and one or more sets of available uplink resources.

Paragraph 37. A method according to Paragraph 35 or Paragraph 36, wherein the set of uplink resources in which the feedback signal is received is a physical uplink control channel, PUCCH.

Paragraph 38. A method according to any of Paragraphs 35 to 37, wherein the set of uplink resources in which the feedback signal is received is a physical uplink shared channel. PUSCH.

Paragraph 39. A method according to any of Paragraphs 35 to 38, wherein the set of uplink resources in which the feedback signal is received is a physical random access channel. PRACH, and wherein the received preamble indicates the feedback signal.

Paragraph 40. A method according to any of Paragraphs 35 to 39, comprising transmitting, to the communications device prior to transmitting the SDT, a downlink control signal that indicates the set of downlink resources in which the SDT is to be transmitted.

Paragraph 41. A method according to Paragraph 40, comprising receiving the preamble within a first available PRACH that is located a specified number of time units of the wireless radio interface from the location of the downlink control signal.

Paragraph 42. A method according to Paragraph 34, comprising transmitting the signalling information to the communications device while the communications device is operating in a connected state and before the communications device transitions to the inactive state.

Paragraph 43. A method according to Paragraph 42, wherein the set of uplink resources in which the feedback signal is received is a physical uplink control channel, PUCCH.

Paragraph 44. A method according to Paragraph 43, wherein the PUCCH is one of a plurality of available PUCCH resources and is indicated by a downlink control signal transmitted to the communications device prior to transmitting the SDT, wherein the downlink control signal indicates the set of downlink resources in which the SDT is to be transmitted.

Paragraph 45. A method according to Paragraph 44, wherein the plurality of available PUCCH resources are indicated by the configuration indicated by the signalling information.

Paragraph 46. A method according to any of Paragraphs 42 to 45, wherein the set of uplink resources in which the feedback signal is received is a configured grant physical uplink shared channel, CG-PUSCH.

Paragraph 47. A method according to Paragraph 46, comprising receiving both the feedback signal and an uplink SDT from the communications device within the CG-PUSCH.

Paragraph 48. A method according to Paragraph 46 or Paragraph 47, wherein the CG-PUSCH in which the feedback signal is received is one of a plurality of available CG-PUSCHs.

Paragraph 49. A method according to Paragraph 48, wherein the CG-PUSCH in which the feedback signal is received is the earliest available CG-PUSCH from among the plurality of available CG-PUSCHs following transmission of the SDT.

Paragraph 50. A method according to Paragraph 48 or Paragraph 49, wherein the CG-PUSCH in which the feedback signal is received has a lowest index value from among the plurality of available CG-PUSCHs.

Paragraph 51. A method according to any of Paragraphs 48 to 50, wherein the CG-PUSCH in which the feedback signal is received has a highest index value from among the plurality of available CG-PUSCHs.

Paragraph 52. A method according to any of Paragraphs 48 to 51, wherein the CG-PUSCH in which the feedback signal is received has a lowest periodicity from among the plurality of available CG-PUSCHs.

Paragraph 53. A method according to any of Paragraphs 48 to 52, wherein the CG-PUSCH in which the feedback signal is received has a highest periodicity from among the plurality of available CG-PUSCHs.

Paragraph 54. A method according to any of Paragraphs 48 to 53, wherein the CG-PUSCH in which the feedback signal is received is formed from the largest amount of resources from among the plurality of available CG-PUSCHs.

Paragraph 55. A method according to any of Paragraphs 48 to 54, wherein the CG-PUSCH in which the feedback signal is received contains data.

Paragraph 56. A method according to any of Paragraphs 48 to 55, wherein the CG-PUSCH in which the feedback signal is received is indicated by a downlink control signal transmitted to the communications device prior to transmitting the SDT, wherein the downlink control signal indicates the set of downlink resources in which the SDT is to be transmitted.

Paragraph 57. A method according to any of Paragraphs 48 to 56, wherein the CG-PUSCH in which the feedback signal is received is indicated by Radio Resource Control. RRC, signalling transmitted to the communications device.

Paragraph 58. A method according to any of Paragraphs 48 to 57, comprising receiving repeating transmissions of the feedback signal in one or more subsequent CG-PUSCHs of the plurality of available CG-PUSCHs following the CG-PUSCH in which the feedback signal is initially received.

Paragraph 59. A method according to any of Paragraphs 34 to 58, wherein the set of uplink resources in which the feedback signal is received is a set of cell-specific uplink resources which is only for use by communications devices operating in the inactive state and performing SDT with the wireless communications network.

Paragraph 60. An infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry, while the communications device is operating in an inactive state.

to transmit, to the communications device, signalling information indicating a configuration for transmitting feedback in response to the communications device receiving small data transmissions. SDTs, to transmit, to the communications device while the communications device is operating in an inactive state, an SDT within a set of downlink resources of the wireless radio interface, and to receive, from the communications device while the communications device is operating in the inactive state, a feedback signal in response to the transmitted SDT, wherein the feedback signal is received in a set of uplink resources indicated by the configuration indicated by the signalling information.

Paragraph 61. Circuitry for an infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry, while the communications device is operating in an inactive state, to transmit, to the communications device, signalling information indicating a configuration for transmitting feedback in response to the communications device receiving small data transmissions. SDTs, to transmit, to the communications device while the communications device is operating in an inactive state, an SDT within a set of downlink resources of the wireless radio interface, and to receive, from the communications device while the communications device is operating in the inactive state, a feedback signal in response to the transmitted SDT, wherein the feedback signal is received in a set of uplink resources indicated by the configuration indicated by the signalling information.

Paragraph 62. A telecommunications system comprising a communications device according to Paragraph 32 and an infrastructure equipment according to Paragraph 60.

Paragraph 63. A computer program comprising instructions which, when loaded onto a computer, cause the computer to perform a method according to any of Paragraphs 1 to 31 or Paragraphs 34 to 59.

Paragraph 64. A non-transitory computer-readable storage medium storing a computer program according to Paragraph 63.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H, and Toskala A, "LTE for UMTS OFDMA and SC-FDMA based radio access", John Wiley and Sons, 2009.

[2] RP-192330, "New work item: 2-step RACH for NR," ZTE Corporation, 3GPP TSG RAN Meeting #85.

[3] RP-192324, "Revised WID: Support of NR Industrial Internet of Things (IoT)," Nokia, Nokia Shanghai Bell, 3GPP TSG RAN Meeting #85.

[4] RP-191575, "NR-based Access to Unlicensed Spectrum," Qualcomm, Inc., 3GPP TSG RAN Meeting #84.

[5] RP-193252, "New Work Item on NR small data transmission in INACTIVE state," ZTE Corporation, 3GPP TSG RAN Meeting #86.

[6] R2-2102707, "Report from email discussion [POST113-e] [501] [SDT] Selection criteria and overall Procedure," Samsung, 3GPP RAN WG2 Meeting #113bis-e.

[7] European patent application published under number EP3834524.

What is claimed is:

1. A method of operating a communications device configured to transmit signals to and/or to receive signals from a wireless communications network via a wireless radio interface provided by the wireless communications network, the method comprising, while the communications device is operating in an inactive state, receiving, from the wireless communications network, a small data transmission, SDT, within a set of downlink resources of the wireless radio interface, determining, based on a configuration indicated by signalling information received from the wireless communications network previously to the SDT, a set of uplink resources of the wireless radio interface, transmitting, to the wireless communications network in the determined set of uplink resources, a feedback signal in response to the received SDT, receiving the signalling information from the wireless communications network either while the communications device is operating in the inactive state or while the communications device is operating in a connected state and before the communications device transitions to the inactive state, selecting, based on the configuration indicated by the signalling information, one of a plurality of preambles, the selected preamble being associated with the determined set of uplink resources and indicating the set of uplink resources in which the feedback signal will be transmitted, and transmitting, to the wireless communications network before transmitting the feedback signal, the selected preamble.

2. A method according to claim 1, wherein the signalling information comprises an indication of the association between the selected preambles and one or more sets of available uplink resources.

3. A method according to claim 1, wherein the determined set of uplink resources is a physical uplink control channel, PUCCH.

4. A method according to claim 1, wherein the determined set of uplink resources is a physical uplink shared channel, PUSCH.

5. A method according to claim 1, wherein the determined set of uplink resources is a physical random access channel, PRACH, and wherein the selected preamble indicates the feedback signal.

6. A method according to claim 1, comprising
selecting the selected preamble from the plurality of preambles based on the configuration indicated by the signalling information.

7. A method according to claim 1, comprising
receiving, from the wireless communications network prior to receiving the SDT, a downlink control signal that indicates the set of downlink resources in which the SDT is to be received.

8. A method according to claim 7, comprising
selecting the selected preamble from the plurality of preambles based on an indication carried by the downlink control signal.

9. A method according to claim 7, comprising
selecting the selected preamble from the plurality of preambles based on an identifier of the downlink control signal.

10. A method according to claim 7, comprising
transmitting the selected preamble within a first available PRACH that is located a specified number of time units of the wireless radio interface from the location of the downlink control signal.

11. A method according to claim 1, comprising
determining the set of uplink resources in accordance with whether or not the communications device has an uplink SDT to transmit to the wireless communications network in addition to the feedback signal.

12. A method according to claim 2, comprising
receiving the signalling information from the wireless communications network while the communications device is operating in a connected state and before the communications device transitions to the inactive state.

13. A method according to claim 12, wherein the determined set of uplink resources is a physical uplink control channel, PUCCH.

14. A method according to claim 13, wherein the PUCCH is one of a plurality of available PUCCH resources and is indicated by a downlink control signal received from the wireless communications network prior to receiving the SDT, wherein the downlink control signal indicates the set of downlink resources in which the SDT is to be received.

15. A method according to claim 14, wherein the plurality of available PUCCH resources are indicated by the configuration indicated by the signalling information.

16. A method according to claim 12, wherein the determined set of uplink resources is a configured grant physical uplink shared channel, CG-PUSCH.

17. A method according to claim 16, comprising
transmitting both the feedback signal and an uplink SDT to the wireless communications network within the CG-PUSCH.

18. A communications device configured to transmit signals to and/or to receive signals from a wireless communications network, the communications device comprising
transceiver circuitry configured to transmit signals and receive signals via a wireless radio interface provided by the wireless communications network, and
controller circuitry configured in combination with the transceiver circuitry, while the communications device is operating in an inactive state,
to receive, from the wireless communications network, a small data transmission, SDT, within a set of downlink resources of the wireless radio interface,
to determine, based on a configuration indicated by signalling information received from the wireless communications network previously to the SDT, a set of uplink resources of the wireless radio interface, and
to transmit, to the wireless communications network in the determined set of uplink resources, a feedback signal in response to the received SDT,
to receive the signalling information from the wireless communications network either while the communications device is operating in the inactive state or while the communications device is operating in a connected state and before the communications device transitions to the inactive state,
to select, based on the configuration indicated by the signalling information, one of a plurality of preambles, the selected preamble being associated with the determined set of uplink resources and indicating the set of uplink resources in which the feedback signal will be transmitted, and
to transmit, to the wireless communications network before transmitting the feedback signal, the selected preamble.

* * * * *